United States Patent
Ko et al.

(10) Patent No.: US 10,447,346 B2
(45) Date of Patent: Oct. 15, 2019

(54) INVERTER AND WIRELESS POWER TRANSMITTER USING THE SAME

(71) Applicant: SAMSUNG ELECTRO-MECHANICS CO., LTD., Suwon-si (KR)

(72) Inventors: Tae Seok Ko, Suwon-si (KR); Young Su Jang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 62 days.

(21) Appl. No.: 15/653,642

(22) Filed: Jul. 19, 2017

(65) Prior Publication Data

US 2018/0102813 A1 Apr. 12, 2018

(30) Foreign Application Priority Data

Oct. 12, 2016 (KR) .......................... 10-2016-0132380

(51) Int. Cl.
*H02J 7/02* (2016.01)
*H04B 5/00* (2006.01)
*H02J 50/12* (2016.01)

(52) U.S. Cl.
CPC ............ *H04B 5/0037* (2013.01); *H02J 7/025* (2013.01); *H02J 50/12* (2016.02); *H04B 5/0075* (2013.01)

(58) Field of Classification Search
CPC .................................................. H04B 5/0037
USPC ....................................................... 320/108
See application file for complete search history.

(56) References Cited

U.S. PATENT DOCUMENTS

| | | | |
|---|---|---|---|
| 6,282,111 B1* | 8/2001 | Illingworth | H02M 7/53871 363/132 |
| 7,733,670 B2* | 6/2010 | Feng | H02J 7/35 363/17 |
| 8,514,593 B2* | 8/2013 | Brinlee | H02M 3/28 363/21.12 |
| 2001/0054881 A1* | 12/2001 | Watanabe | H02J 7/0065 320/166 |
| 2010/0321958 A1* | 12/2010 | Brinlee | H01F 3/14 363/21.1 |
| 2012/0235623 A1* | 9/2012 | Ishino | H01M 10/44 320/101 |
| 2014/0368164 A1 | 12/2014 | Jung | |
| 2015/0008756 A1* | 1/2015 | Lee | H02J 17/00 307/104 |
| 2016/0181798 A1* | 6/2016 | Izadian | H02M 7/797 307/31 |
| 2018/0123396 A1* | 5/2018 | Min | H02J 50/12 |
| 2018/0183320 A1* | 6/2018 | Shen | H02M 1/08 |
| 2018/0219402 A1* | 8/2018 | Chen | H02J 7/025 |

FOREIGN PATENT DOCUMENTS

| | | |
|---|---|---|
| JP | 2016-004746 A | 1/2016 |
| KR | 10-2011-0043237 A | 4/2011 |
| KR | 10-2014-0109390 A | 9/2014 |

* cited by examiner

*Primary Examiner* — Suresh Memula
(74) *Attorney, Agent, or Firm* — NSIP Law

(57) ABSTRACT

An inverter includes a pulse generator configured to generate a reference pulse signal having a first frequency; and a gate signal generator configured to apply a pulse width modulation control having a variable duty rate, based on a second frequency, to the reference pulse signal to generate a gate signal.

17 Claims, 5 Drawing Sheets

INVERTER AND WIRELESS POWER TRANSMITTER USING THE SAME

CROSS-REFERENCE TO RELATED APPLICATION(S)

This application claims benefit of Korean Patent Application No. 10-2016-0132380 filed on Oct. 12, 2016 in the Korean Intellectual Property Office, the entire disclosure of which is incorporated herein by reference for all purposes.

BACKGROUND

1. Field

The following description relates to an inverter and a wireless power transmitter using the same.

2. Description of Related Art

With the development of wireless technology, various wireless functions, such as transmission of data and transmission of power have developed. In recent times, a wireless power transmission technology that is capable of charging an electronic device with power, even in a non-contact state, has been developed.

A conventional wireless power transmission technology boosts a direct current (DC) voltage output from a power adapter, or the like, to an appropriate voltage required by an inverter using a DC-DC converter and uses the boosted voltage.

However, since such a conventional wireless power transmission technology requires a DC-DC converter\, as well as elements such as an inductor, a field effect transistor (FET), a capacitor to configure to the DC-DC converter, the structure of an apparatus using these components may be complicated.

In addition, since power conversion efficiency may be degraded by a DC-DC converter stage, the overall power efficiency of a wireless charging is decreased.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an inverter including a pulse generator configured to generate a reference pulse signal having a first frequency, and a gate signal generator configured to apply a pulse width modulation control having a variable duty rate, based on a second frequency, to the reference pulse signal to generate a gate signal.

The first frequency may be higher than the second frequency.

The inverter may include a controller configured to generate a pulse width modulation signal in response to a feedback signal from a wireless power receiver to provide the pulse width modulation signal to the gate signal generator.

The gate signal generator may be configured to receive the pulse width modulation signal and the reference pulse signal, and to perform a logical product for the pulse width modulation signal and the reference pulse signal to generate the gate signal.

The controller may be configured to adjust a duty rate of the pulse width modulation signal to adjust an output of the inverter.

The inverter may include a switch configured to perform a switching operation in response to a reference pulse included in the gate signal to output an alternating current.

In another general aspect, there is provided a wireless power transmitter including a transmission resonator coupled to a reception resonator of a wireless power receiver, and an inverter configured to receive a direct current (DC) voltage, to apply a pulse width modulation control to a reference pulse signal to generate a gate signal, and to perform a switching operation, in response to the gate signal, to provide an alternating current (AC) signal to the transmission resonator.

The wireless power transmitter may include an AC-DC converter configured to receive commercial AC power, to convert the commercial AC power into the DC voltage, and to provide the DC voltage to the inverter.

The inverter may be configured to vary a duty rate of the pulse width modulation control to adjust an output of the wireless power receiver.

The inverter may include a pulse generator configured to generate a reference pulse signal having a first frequency, and a gate signal may be generator configured to generate the gate signal by applying the pulse width modulation control having a variable duty rate, based on a second frequency, to the reference pulse signal.

The inverter may include a switch configured to perform a switching operation in response to a reference pulse being included in the gate signal to output the alternating current.

The first frequency may be higher than the second frequency.

The wireless power transmitter may include a controller configured to generate a pulse width modulation signal in response to a feedback signal from the wireless power receiver to provide the pulse width modulation signal to the gate signal generator.

The wireless power transmitter may include a demodulator configured to demodulate a signal provided by the wireless power receiver, to generate the feedback signal, and to provide the feedback signal to the controller.

The gate signal generator may be configured to receive the pulse width modulation signal and the reference pulse signal, and to perform a logical product for the pulse width modulation signal and the reference pulse signal to generate the gate signal.

The controller may be configured to adjust a duty rate of the pulse width modulation signal to adjust an output of the inverter.

The demodulator may be configured to detect the feedback signal from the wireless power receiver by extracting modulation data from a change of an output of the transmission resonator.

The transmission resonator may be magnetically coupled to the reception resonator.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
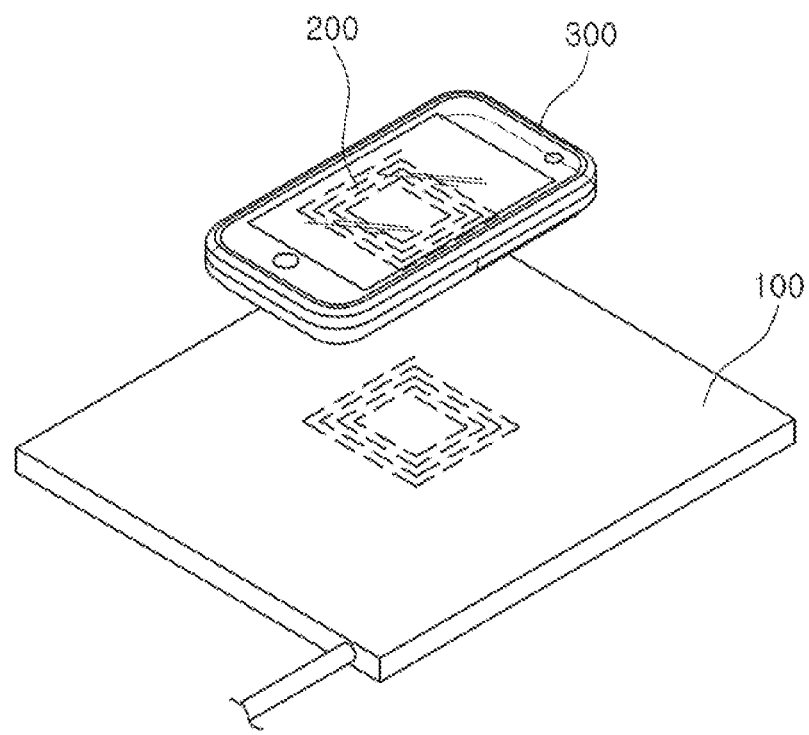
FIG. 1 is a diagram illustrating an example of a wireless power transmitter.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a diagram illustrating an example of a wireless power transmitter.

Referring to FIG. 1, a wireless power receiver 200, adjacent to a wireless power transmitter 100 is magnetically coupled (e.g., magnetically resonated or magnetically induced) to the wireless power transmitter 100 to wirelessly receive power.

The wireless power receiver 200 provides the received power to an electronic device 300. In an example, the wireless power receiver 200 is implemented as one component within the electronic device 300, and in another example the wireless power receiver 200 is a separate device connected to the electronic device 300.

In an example, the wireless power transmitter 100 uses an invert that performs a switching operation using a reference pulse. Specifically, a level of an output of the wireless power transmitter 100 is adjusted by applying pulse width modulation having a variable duty rate for the reference pulse.

Figure 2:
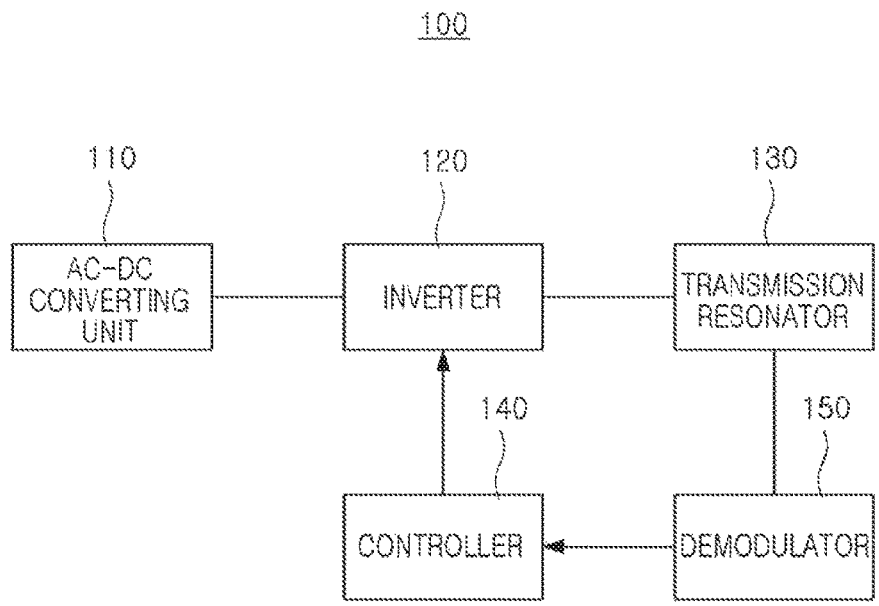
FIG. 2 is a diagram illustrating an example of a wireless power transmitter.

FIG. 2 is a diagram illustrating a wireless power transmitter.

Referring to FIG. 2, in an example, the wireless power transmitter includes an inverter 120 and a transmission resonator 130. In an example, the wireless power transmitter 100 further includes at least one of an alternating current (AC) to direct current (DC) converting unit 110, a controller 140, and a demodulator 150.

The AC-DC converting unit 110 receives commercial AC power and converts the received commercial AC power into a DC voltage usable in the inverter 120.

In an example, the AC-DC converting unit 110 is a power adapter, and is implemented as one component of the wireless power transmitter 100. In another example, the AC-DC converting unit 110 is implemented as a separate device, connectable to the wireless power transmitter 100.

In an example, the inverter 120 receives a DC voltage, and applies a pulse width modulation (PWM) control to a reference pulse signal to generate a gate signal. The inverter 120 performs a switching operation in response to the generated gate signal to provide an AC current to the transmission resonator 130.

In an example, the inverter 120 performs the switching operation in response to the reference pulse signal, and adjusts a level of an output of the wireless power receiver by varying a duty rate of the pulse width modulation control for the reference pulse. Because the inverter 120 does not strictly limit an input voltage, a DC-DC converter is optionally implemented or included at a front end of the inverter 120.

In an example, the transmission resonator 130 receives an alternating current from the inverter 120 to generate a magnetic field. In an example, the transmission resonator 130 is magnetically coupled to a reception resonator of the wireless power receiver to wirelessly supply the power to the wireless power receiver.

In an example, the demodulator 150 demodulates a signal received from the wireless power receiver to detect a feedback signal from the wireless power receiver to provide the feedback signal to the controller 140.

For example, the wireless power transmitter and the wireless power receiver may perform an in-band type of modulation. In this example, the demodulator 150 may detect the feedback signal from the wireless power receiver by extracting modulation data from a change of an output of the transmission resonator 130 and demodulating the modulation data.

In an example, the controller 140 controls the output of the wireless power transmitter.

For example, the controller 140 controls the output of the wireless power transmitter in response to the feedback signal provided by the wireless power receiver. To this end, the controller 140 provides the pulse width modulation signal to the inverter 120 to adjust an output of the inverter 120.

The controller 140 includes at least one processor. In an example, the controller 140 may further include a memory. The processor may include components such as, for example, a central processing unit (CPU), a graphics processing unit (GPU), a microprocessor, an application specific integrated circuit (ASIC), field programmable gate arrays (FPGA). In an example, the processor has a plurality of cores. The processor may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing. The memory may be a volatile memory, such as, for example, random access memory (RAM), dynamic random access memory (DRAM), static random access memory (SRAM), a non-volatile memory, such as, for example, a read only memory (ROM), random-access programmable read only memory (PROM), electrically erasable programmable read-only memory (EEPROM) or a flash memory, or a combination thereof.

Figure 3:
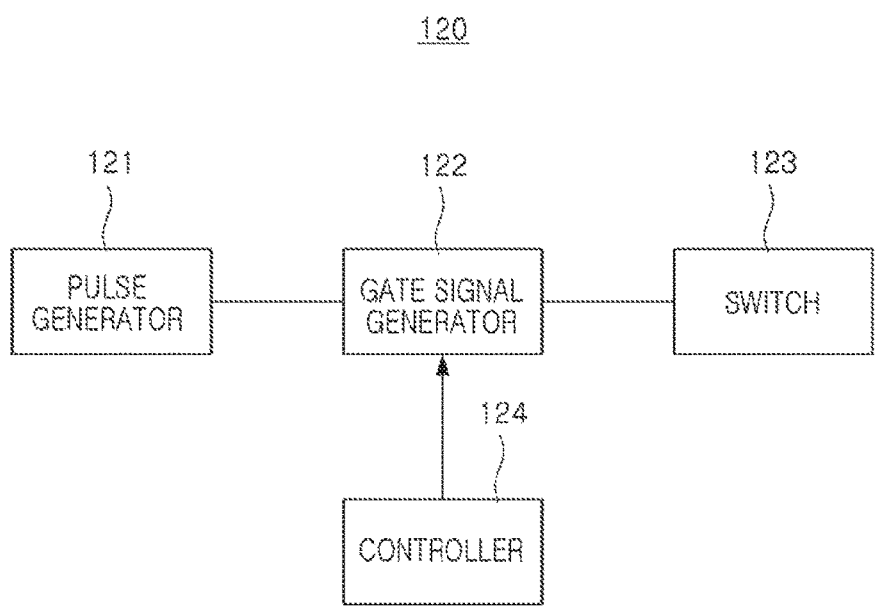
FIG. 3 is a diagram illustrating an example of an inverter illustrated in FIG. 2.
Figure 4:
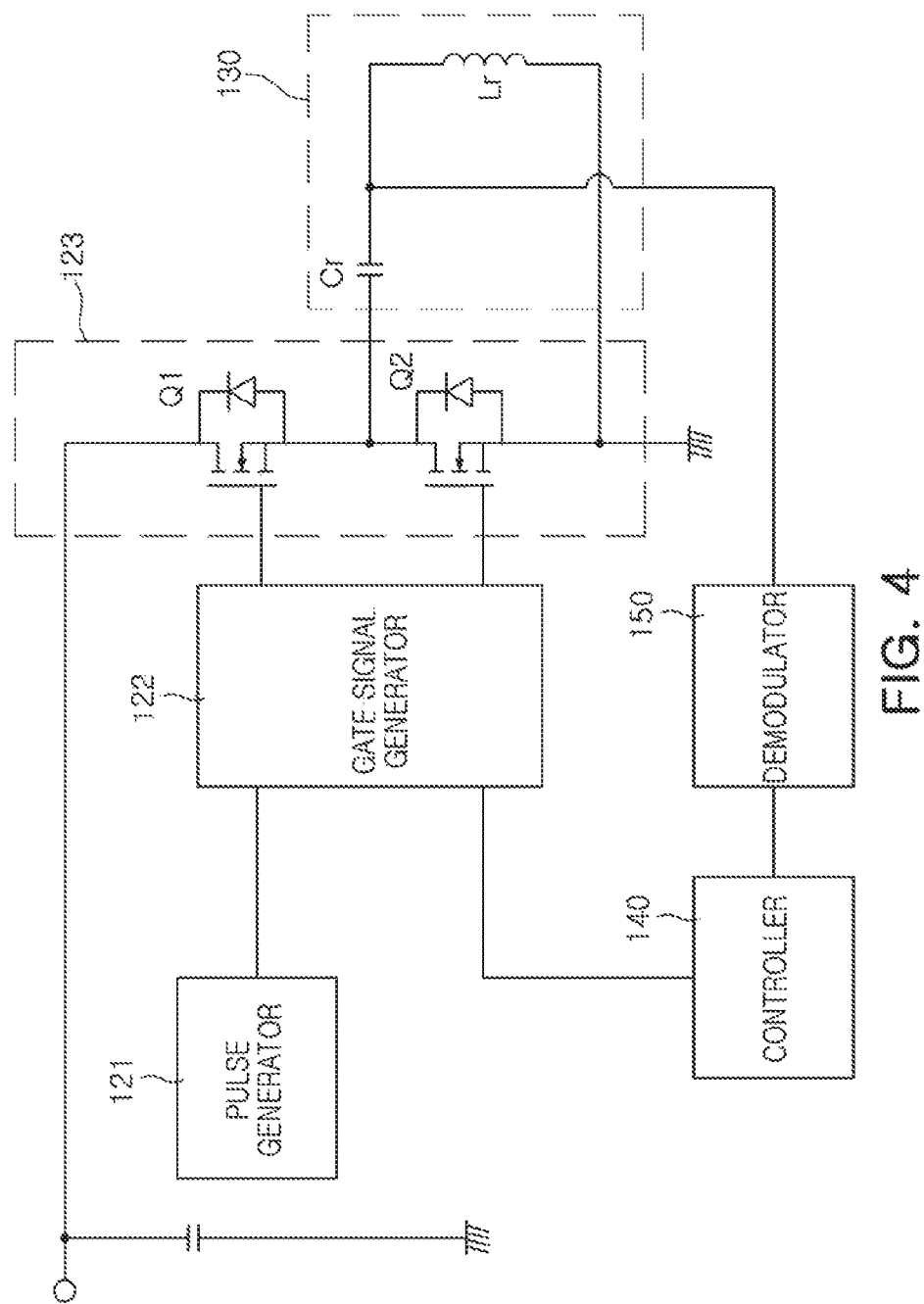
FIG. 4 is a diagram illustrating an example of the wireless power transmitter illustrated in FIG. 2.

FIG. 3 is a diagram illustrating an example of an inverter illustrated in FIG. 2 and FIG. 4 is a diagram illustrating an example of the wireless power transmitter illustrated in FIG. 2.

Referring to FIGS. 3 and 4, the inverter 120 includes a pulse generator 121 and a gate signal generator 122. In an example, the inverter 120 includes a switch 123. In an example, a controller 124 illustrated in FIG. 3 may be replaced with the controller 140 illustrated in FIG. 2.

In an example, the pulse generator 121 generates a reference pulse signal having a first frequency. Here, the first frequency may be a frequency corresponding to a high frequency (e.g., several to several tens of MHz). Because the pulse width modulation control is performed by applying a variable duty rate to the reference pulse at a second frequency, a wide output range of the inverter 120 may be set by configuring the first frequency to be sufficiently high.

In an example, the gate signal generator 122 generates the gate signal by applying the pulse width modulation control having the variable duty rate based on the second frequency to the reference pulse signal. Here, the second frequency may be a low frequency domain, lower than the first frequency. For example, the second frequency may be a frequency of a bandwidth of tens to hundreds of KHz.

The switch 123 may perform a switching operation in response to the reference pulse included in the gate signal to output an alternating current. In an example illustrated in FIG. 4, the switch 123 includes a first switch Q1 and a second switch Q2. In an example, the first switch Q1 and the second switch Q2 are alternately operated.

Because the generated gate signal is input to the switch 123 and is used to control the switching operation, the switch 123 adjusts strength of a magnetic field generated in the transmission resonator 130 by adjusting a duty rate of the gate signal.

In an example, the controller 124 receives the feedback signal provided by the wireless power receiver, and generates the pulse width modulation signal in response to the feedback signal to provide the pulse width modulation signal to the gate signal generator 122.

Therefore, the controller 124 adjusts the output of the inverter 120 by adjusting a duty rate of the pulse width modulation signal.

For example, when a voltage gain is to be increased, the controller 124 increases the duty rate of the pulse width modulation signal, and because a larger number of reference pulses are included in the gate signal generated in response to the increase of the duty rate of the pulse width modulation signal, the output of the wireless power transmitter 100 is increased.

Figure 5:
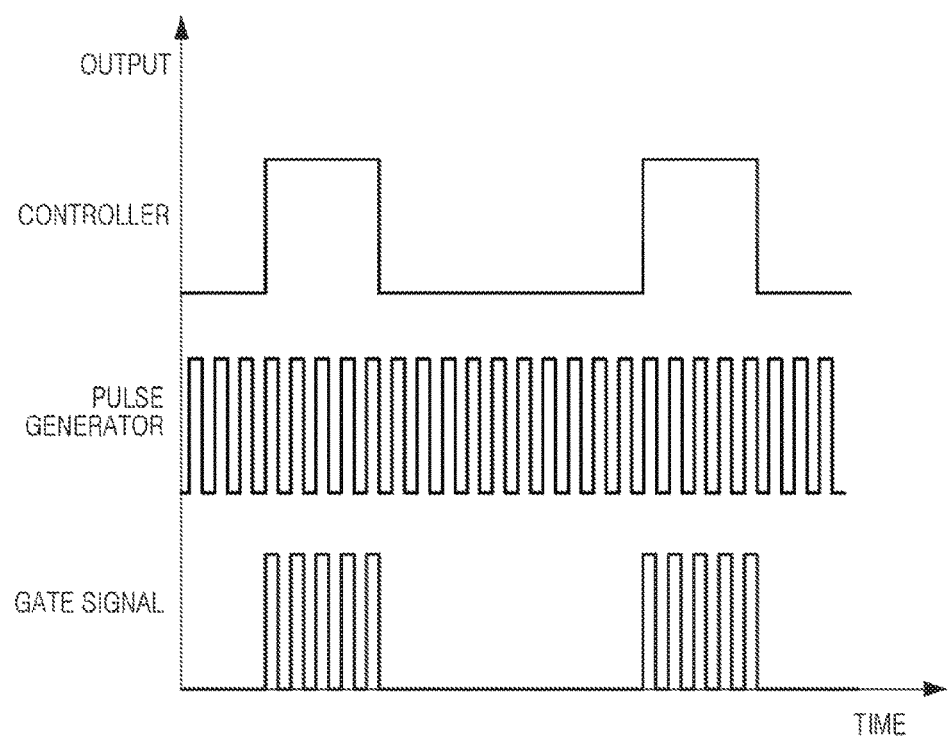
FIG. 5 is a diagram illustrating an example of output waveforms of the respective components of FIG. 4.

FIG. 5 is a diagram illustrating an example of output waveforms of the respective components of FIG. 4.

Referring to FIGS. 4 and 5, the pulse generator 121 continuously outputs the reference pulse of high frequency.

The controller 140 applies the variable duty rate based on the second frequency to the pulse width modulation signal and outputs the pulse width modulation signal to control the output of the wireless power transmitter, in response to the feedback signal provided by the demodulator 150.

In an example, a frequency of the pulse width modulation signal output from the controller 140 is fixed, and a frequency of the reference pulse signal generated by the pulse generator 121 is also fixed. Therefore, as illustrated, the gate signal generator 122 performs a logic product for the two input signals to generate the gate signal.

Figure 6:
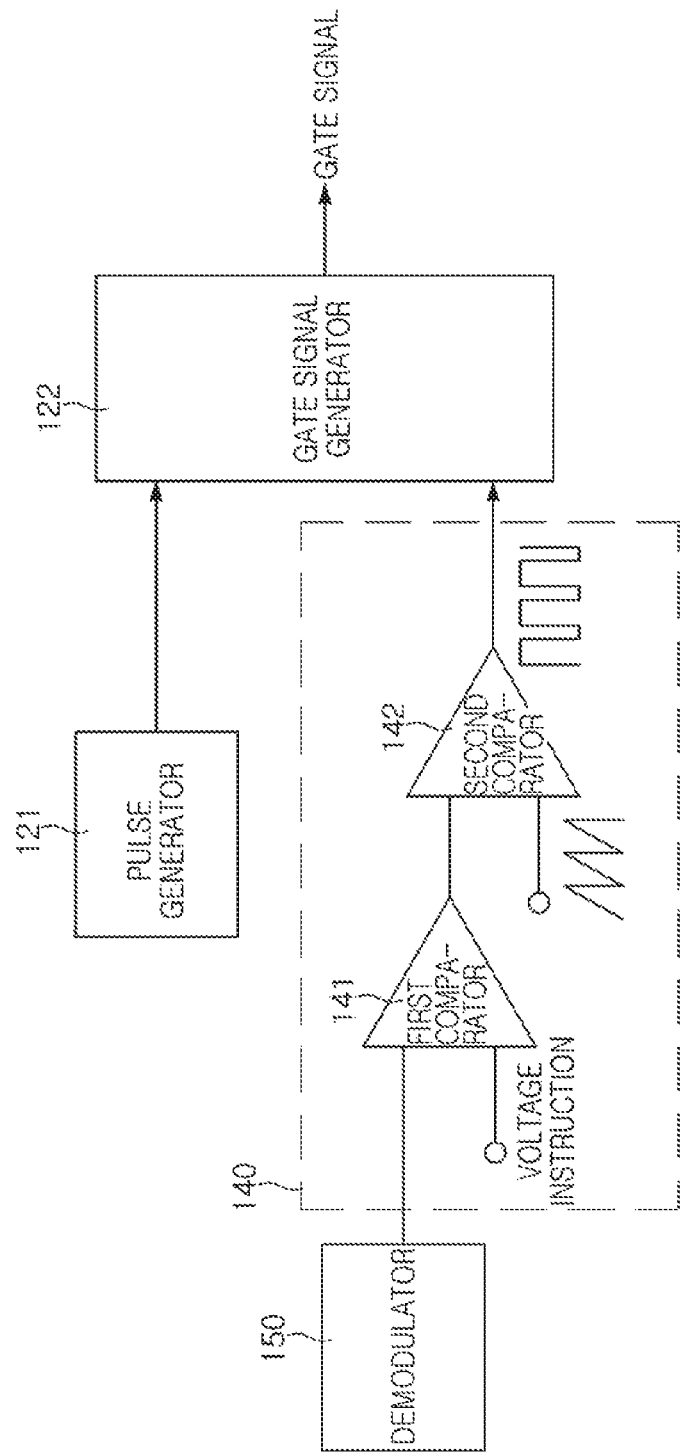
FIG. 6 is a diagram illustrating an example of a controller illustrated in FIG. 4.

FIG. 6 is a diagram illustrating an example of a controller illustrated in FIG. 4.

Referring to FIG. 6, the demodulator 150 demodulates the feedback signal transmitted from the wireless power receiver, and provides the demodulated feedback signal to a first comparator 141 of the controller 140. In an example, the first comparator is an error amplifier.

A second comparator 142 receives a triangular wave having a low frequency, and compares the triangular wave with an output of the first comparator 141 to output the pulse width modulation signal of which the duty rate is adjusted.

For example, when a value output from the demodulator 150 is greater than a voltage instruction, the output of the first comparator 141 is decreased. When the output of the first comparator 141 is decreased, the second comparator 142 outputs a square wave having a decreased duty rate, which is provided to the gate signal generator 122 as the pulse width modulation signal. The gate signal generator 122 performs the logical product for the pulse width modulation signal and the reference pulse signal to output the gate signal. As a result, the output of the wireless power transmitter may be decreased.

When the value output from the demodulator 150 is smaller than the voltage instruction, the output of the first comparator 141 is increased. When the output of the first comparator 141 is increased, the second comparator 142 outputs a square wave having an increased duty rate, which is provided to the gate signal generator 122 as the pulse width modulation signal. The gate signal generator 122 performs the logical product for the pulse width modulation signal and the reference pulse signal to output the gate signal. As a result, the output of the wireless power transmitter is increased.

As such, the controller 140 may control a level of the output of the wireless power transmitter by adjusting the duty rate of the pulse width modulation signal in response to the feedback signal.

As set forth above, the wireless power transmitter may be miniaturized and manufactured at a low cost by controlling the output of the wireless power transmitter by the described structure.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An inverter comprising:
a pulse generator configured to generate a reference pulse signal having a first frequency;
a gate signal generator configured to apply a pulse width modulation control having a variable duty rate, based on a second frequency, to the reference pulse signal to generate a gate signal; and
a controller configured to generate a pulse width modulation signal in response to a feedback signal from a wireless power receiver to provide the pulse width modulation signal to the gate signal generator.

2. The inverter of claim 1, wherein the first frequency is higher than the second frequency.

3. The inverter of claim 1, wherein the gate signal generator is further configured to receive the pulse width modulation signal and the reference pulse signal, and to perform a logical product for the pulse width modulation signal and the reference pulse signal to generate the gate signal.

4. The inverter of claim 1, wherein the controller is further configured to adjust a duty rate of the pulse width modulation signal to adjust an output of the inverter.

5. The inverter of claim 1, further comprising:
a switch configured to perform a switching operation in response to a reference pulse included in the gate signal to output an alternating current.

6. A wireless power transmitter comprising:
a transmission resonator coupled to a reception resonator of a wireless power receiver; and
an inverter configured to receive a direct current (DC) voltage, to apply a pulse width modulation control to a reference pulse signal to generate a gate signal, and to perform a switching operation, in response to the gate signal, to provide an alternating current (AC) signal to the transmission resonator.

7. The wireless power transmitter of claim 6, further comprising:
an AC-DC converter configured to receive commercial AC power, to convert the commercial AC power into the DC voltage, and to provide the DC voltage to the inverter.

8. The wireless power transmitter of claim 6, wherein the inverter is further configured to vary a duty rate of the pulse width modulation control to adjust an output of the wireless power receiver.

9. The wireless power transmitter of claim 6, wherein the inverter comprises a pulse generator configured to generate a reference pulse signal having a first frequency; and
a gate signal generator configured to generate the gate signal by applying the pulse width modulation control having a variable duty rate, based on a second frequency, to the reference pulse signal.

10. The wireless power transmitter of claim 9, wherein the inverter further comprises a switch configured to perform a switching operation in response to a reference pulse being included in the gate signal to output the alternating current.

11. The wireless power transmitter of claim 9, wherein the first frequency is higher than the second frequency.

12. The wireless power transmitter of claim 9, further comprising
a controller configured to generate a pulse width modulation signal in response to a feedback signal from the wireless power receiver to provide the pulse width modulation signal to the gate signal generator.

13. The wireless power transmitter of claim 12, further comprising
a demodulator configured to demodulate a signal provided by the wireless power receiver, to generate the feedback signal, and to provide the feedback signal to the controller.

14. The wireless power transmitter of claim 13, wherein the demodulator is further configured to detect the feedback signal from the wireless power receiver by extracting modulation data from a change of an output of the transmission resonator.

15. The wireless power transmitter of claim 12, wherein the gate signal generator is further configured to receive the pulse width modulation signal and the reference pulse signal, and to perform a logical product for the pulse width modulation signal and the reference pulse signal to generate the gate signal.

16. The wireless power transmitter of claim 12, wherein the controller is further configured to adjust a duty rate of the pulse width modulation signal to adjust an output of the inverter.

17. The wireless power transmitter of claim 6, wherein the transmission resonator is magnetically coupled to the reception resonator.

* * * * *